US010374785B2

(12) United States Patent
Ho et al.

(10) Patent No.: US 10,374,785 B2
(45) Date of Patent: Aug. 6, 2019

(54) CLOCK PHASE ADJUSTMENT USING CLOCK AND DATA RECOVERY SCHEME

(71) Applicant: Intel Corporation, Santa Clara, CA (US)

(72) Inventors: Yick Yaw Darren Ho, Folsom, CA (US); Michael W Altmann, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/391,593

(22) Filed: Dec. 27, 2016

(65) Prior Publication Data

US 2018/0183633 A1    Jun. 28, 2018

(51) Int. Cl.
*H04L 7/00* (2006.01)
*H04L 7/033* (2006.01)

(52) U.S. Cl.
CPC .............. *H04L 7/00* (2013.01); *H04L 7/033* (2013.01)

(58) Field of Classification Search
None
See application file for complete search history.

(56) References Cited

U.S. PATENT DOCUMENTS

| 6,748,027 B1* | 6/2004 | Kocaman | H03L 7/0891 375/316 |
| 7,012,983 B2* | 3/2006 | Buchwald | H03L 7/0814 375/354 |
| 8,433,020 B2* | 4/2013 | Buchwald | H03L 7/0814 327/156 |
| 8,649,476 B2* | 2/2014 | Malipatil | H04L 7/0062 375/219 |
| 8,693,596 B1* | 4/2014 | Warner | H03G 3/00 370/395.62 |
| 8,886,730 B2* | 11/2014 | Kowalewski | H04L 65/1016 709/205 |
| 8,890,580 B2* | 11/2014 | Zerbe | H03K 5/1252 327/108 |

(Continued)

FOREIGN PATENT DOCUMENTS

| WO | WO 2015099919 A1 * | 7/2015 | ........... H04L 7/0041 |
| WO | WO-2015099919 A1 * | 7/2015 | ........... H04L 7/0041 |

(Continued)

*Primary Examiner* — Berhanu Tadese
(74) *Attorney, Agent, or Firm* — Schwegman Lundberg & Woessner, P.A.

(57) ABSTRACT

Some embodiments include apparatus and methods using clock generation circuitry to generate a first clock signal and a second clock signal based on an input clock signal, the first and second clock signals having different phases, sampler circuitry to sample an input signal based on timing of the first and second clock signals and provide data information and error information associated with sampling of the input signal, a clock and data recovery unit to generate first control information based on the data information and the error information, and a phase error detection unit to generate second control information based on the data information and the error information, the clock generation circuitry to control timing of the input clock signal based on the first control information and to control timing of the first and second clock signals based on the second control information.

10 Claims, 7 Drawing Sheets

(56) References Cited

U.S. PATENT DOCUMENTS

| | | | | |
|---|---|---|---|---|
| 8,942,334 B1* | 1/2015 | Zortea | H04L 7/0334 | 375/355 |
| 9,048,999 B2* | 6/2015 | He | H04L 7/0062 | |
| 9,124,455 B1* | 9/2015 | Lim | H04L 25/03343 | |
| 9,294,260 B2* | 3/2016 | Giaconi | H04L 7/0041 | |
| 9,313,017 B1* | 4/2016 | Liao | H04L 7/0087 | |
| 9,374,250 B1* | 6/2016 | Musah | H04L 7/0058 | |
| 9,397,823 B2* | 7/2016 | Zerbe | H03K 5/1252 | |
| 9,401,800 B1* | 7/2016 | Kang | H04L 7/0062 | |
| 9,438,409 B1* | 9/2016 | Liao | H04L 7/0062 | |
| 9,455,848 B1* | 9/2016 | Zhang | H04L 25/03057 | |
| 9,479,364 B2* | 10/2016 | He | H04L 7/0062 | |
| 9,537,682 B2* | 1/2017 | Venkatram | H04L 7/033 | |
| 9,559,878 B2* | 1/2017 | Giaconi | H04L 7/0041 | |
| 9,794,089 B2* | 10/2017 | Musah | H04L 7/0058 | |
| 10,009,194 B2* | 6/2018 | He | H04L 7/0062 | |
| 2006/0227916 A1* | 10/2006 | Masui | H03L 7/0995 | 375/355 |
| 2008/0124092 A1* | 5/2008 | Dvir | H04L 7/0337 | 398/155 |
| 2010/0086090 A1* | 4/2010 | Lin | G11B 20/14 | 375/354 |
| 2010/0284686 A1* | 11/2010 | Zhong | H04L 25/03019 | 398/1 |
| 2010/0329318 A1* | 12/2010 | Dai | H04L 1/20 | 375/224 |
| 2011/0075781 A1* | 3/2011 | Kenney | H03L 7/235 | 375/376 |
| 2011/0142120 A1* | 6/2011 | Liu | H04L 25/03057 | 375/233 |
| 2011/0167297 A1* | 7/2011 | Su | H04L 7/0054 | 714/15 |
| 2012/0057627 A1* | 3/2012 | Chan | H04L 25/03057 | 375/233 |
| 2012/0257652 A1* | 10/2012 | Malipatil | H04L 7/0062 | 375/219 |
| 2013/0148712 A1* | 6/2013 | Malipatil | H04L 25/0307 | 375/233 |
| 2013/0170591 A1* | 7/2013 | Su | H04L 7/02 | 375/359 |
| 2013/0216014 A1* | 8/2013 | Kong | H03L 7/07 | 375/376 |
| 2014/0086291 A1* | 3/2014 | Asmanis | H04B 17/12 | 375/224 |
| 2014/0286381 A1* | 9/2014 | Shibasaki | H03L 7/089 | 375/226 |
| 2014/0307769 A1* | 10/2014 | He | H04L 7/0062 | 375/233 |
| 2015/0092898 A1* | 4/2015 | Lee | H04L 7/0062 | 375/354 |
| 2015/0188693 A1* | 7/2015 | Giaconi | H04L 7/0041 | 375/233 |
| 2015/0207648 A1* | 7/2015 | Palusa | H04L 25/03057 | 375/233 |
| 2015/0236875 A1* | 8/2015 | Palusa | H04L 25/03057 | 375/233 |
| 2015/0249556 A1* | 9/2015 | He | H04L 7/0062 | 375/233 |
| 2015/0349991 A1* | 12/2015 | Iyer | H04L 25/03146 | 375/233 |
| 2016/0164704 A1* | 6/2016 | Giaconi | H04L 7/0041 | 375/233 |
| 2016/0277219 A1* | 9/2016 | Venkatram | H04L 7/033 | |
| 2017/0033918 A1* | 2/2017 | Hossain | H04L 7/0087 | |
| 2017/0070370 A1* | 3/2017 | He | H04L 7/0062 | |
| 2017/0134190 A1* | 5/2017 | Hoshyar | H04L 7/0331 | |
| 2018/0083638 A1* | 3/2018 | Tajalli | H04L 25/40 | |
| 2018/0183633 A1* | 6/2018 | Ho | H04L 7/033 | |

FOREIGN PATENT DOCUMENTS

| | | | | |
|---|---|---|---|---|
| WO | WO 2016140743 A1 * | 9/2016 | H04L 25/03019 |
| WO | WO-2016140743 A1 * | 9/2016 | H04L 25/03019 |

* cited by examiner

CLOCK PHASE ADJUSTMENT USING CLOCK AND DATA RECOVERY SCHEME

TECHNICAL FIELD

Embodiments described herein pertain to data transmission. Some embodiments relate to clock and data recovery (CDR) in electronic devices.

BACKGROUND

Many electronic devices or systems, such as computers, tablets, and digital televisions, include components (e.g., integrated circuit chips) located on a circuit board. The components may communicate with each other using signals that can carry data. The signals are usually transmitted on conductive lines, such as metal-based traces, on the circuit board. As technology advances, some electrical components transmit data from one component (e.g., a transmitter) to another component (e.g., a receiver) at a relatively high data rate (e.g., 2 Gigabits per second or higher). In some data transfer schemes, a receiver captures transmitted data based on timing of a clock signal (or multiple clock signals) generated by the receiver. In such data capturing schemes, many receivers have clock and data recovery (CDR) circuitry to control timing of the clock signal to ensure that the data is accurately captured. Some of these receivers also have extra circuitry to calibrate the timing of the clock signal. However, drawbacks introduced by such extra circuitry in some of these receivers may be difficult to avoid.

DETAILED DESCRIPTION

The techniques described herein involve a receiver having circuitry to control (e.g., adjust) timing of clock signals that are generated by the receiver to capture data information transmitted to the receiver from a transmitter. The described circuitry can be used to calibrate timing of the clock signals in the receiver. The described circuitry can also be used as part of CDR circuitry of the receiver. The described techniques allow the receiver to reduce or prevent phase errors in timing of the clock signals.

The receiver described herein includes N-way interleaved circuit paths (e.g., N-way interleaved circuit slices) and a CDR-directed phase error detection unit. The receiver includes clock generation circuitry that generates clock signals having different phases. The receiver can calibrate phases of the clock signals during run time using control information provided by the CDR-directed phase error detection unit. The control information is generated using a new baud-rate timing recovery equation (new baud-rate CDR scheme). As described in more detail below, the techniques described herein use the same phase error information provided to the CDR circuitry to generate the control information for phase calibration of clock signals in the receiver. Thus, extra circuitry to perform the clock phase calibration can be avoided. This may save device area and cost. Plus, operations (e.g., phase update and tracking operations) associated with clock phase calibration can be done in the digital domain and the majority of logic circuitry can run at significantly reduced frequency for low power consumption. Other circuitry and improvements associated with the described techniques are discussed below.

Figure 1:
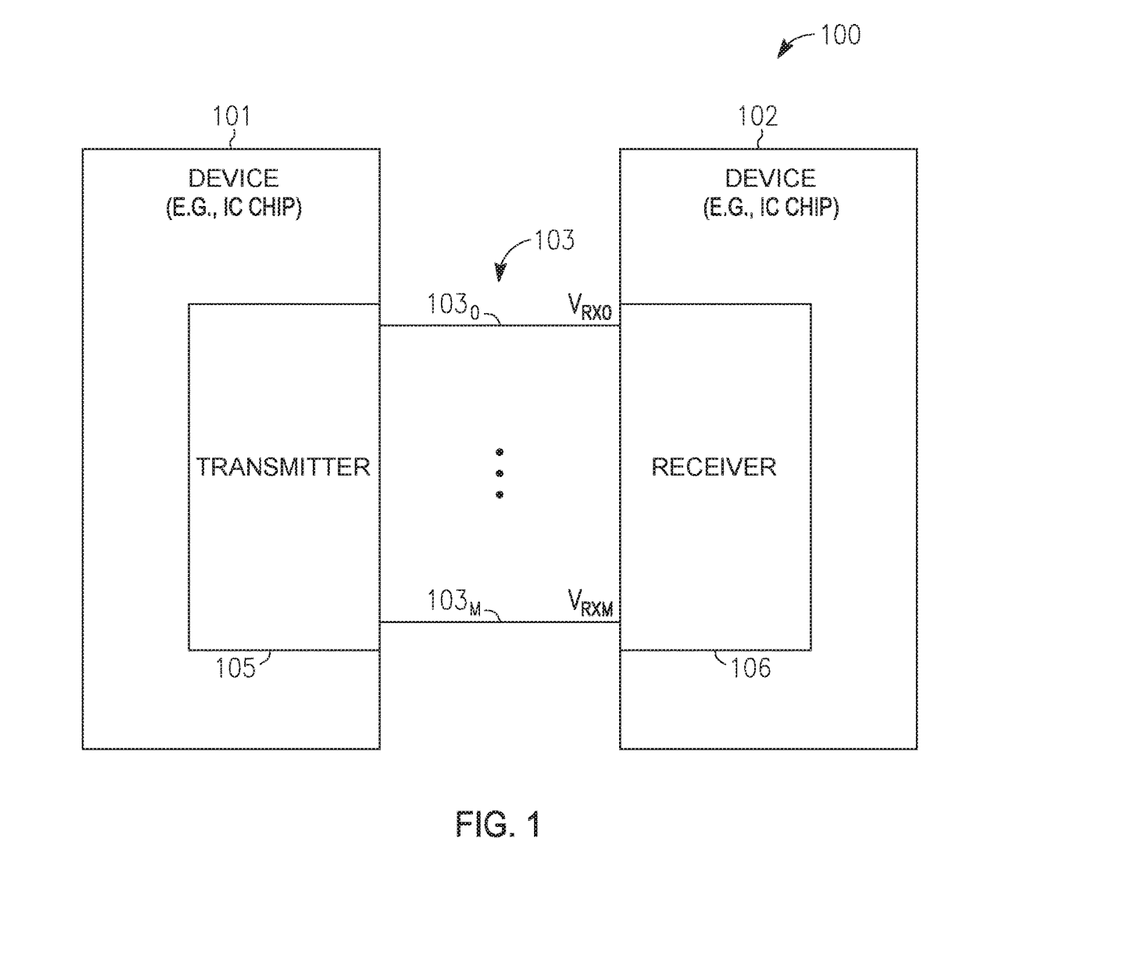
FIG. 1 shows an apparatus including devices and a channel between the devices, according to some embodiments described herein.

FIG. 1 shows an apparatus 100 including devices 101 and 102, and a channel 103 between devices 101 and 102, according to some embodiments described herein. Apparatus 100 can include or be included in an electronic device or system, such as a computer (e.g., server, desktop, laptop, or notebook), a tablet, a cellular phone, or other electronic devices or systems. Each of devices 101 and 102 can include an integrated circuit (IC), such as an IC chip. Devices 101 and 102 can include controllers (e.g., processors, graphics controllers, input/output controllers), memory devices, or other electronic devices. As shown in FIG. 1, devices 101 and 102 can include a transmitter 105 and a receiver 106, respectively.

Channel 103 can include lanes $103_0$ through $103_M$ to conduct signals between devices 101 and 102. Each of lanes $103_0$ through $103_M$ can include conductive traces (e.g., metal-based traces) on a circuit board (e.g., printed circuit board) where devices 101 and 102 are located. Devices 101 and 102 can communicate with each other by providing signals on lanes $103_0$ through $103_M$. As shown in FIG. 1, for example, transmitter 105 may transmit signals $V_{RX0}$ through $V_{RXM}$ to receiver 106 on lanes $103_0$ through $103_M$, respectively.

Devices 101 and 102 may communicate with each other using signals at a relatively high frequency that correspond to a relatively high data rate (e.g., up to 32 gigabits per second (Gb/s) or higher per lane). At such a high data rate, accurately capturing data information (e.g., bits of data) carried by signals at receiver 106 involve precise timing for clock signals that are used to capture the data information. As described in more detail below, receiver 106 employs techniques to calibrate timing of its clock signals in order to accurately capture the data information. Receiver 106 can include any of the receivers described below with reference to FIG. 2 through FIG. 8.

Figure 2:
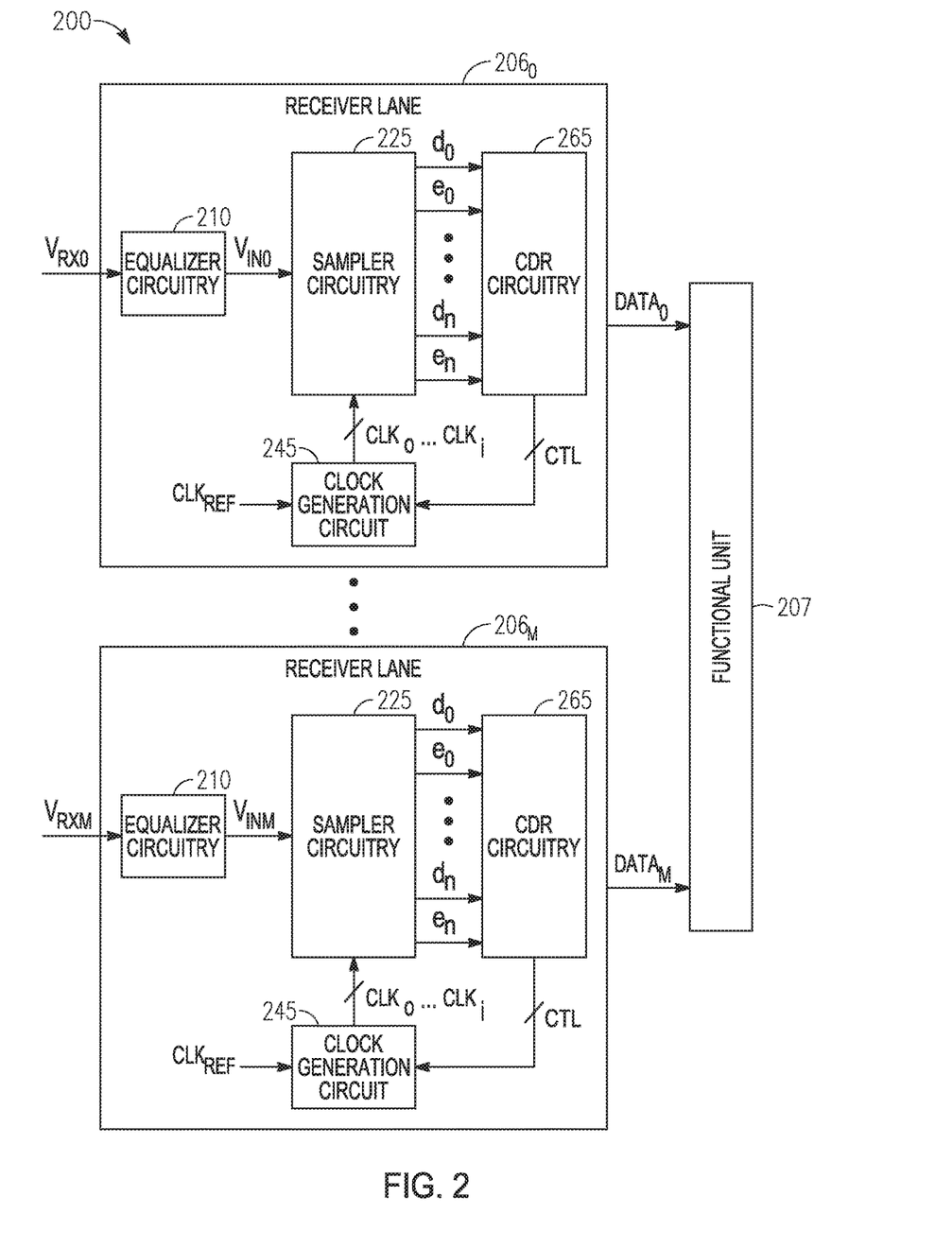
FIG. 2 shows a block diagram of a receiver including receiver lanes, according to some embodiments described herein.

FIG. 2 shows a block diagram of a receiver 206 including receiver lanes $206_0$ through $206_M$, according to some embodiments described herein. Receiver 206 can correspond to receiver 106 of FIG. 1. Receiver lanes $206_0$ through $206_M$ can operate to receive signals $V_{RX0}$ through $V_{RXM}$ respectively. Signals $V_{RX0}$ through $V_{RXM}$ in FIG. 2 can be transmitted to receiver 206 by a transmitter (e.g., transmitter 105 of FIG. 1) through separate lanes (e.g., lanes $103_0$ through $103_M$, respectively) of a channel (e.g., channel 103 of FIG. 1). As shown in FIG. 2, each of receiver lanes $206_0$ through $206_M$ can include equalizer circuitry 210, sampler circuitry 225, clock generation circuitry 245, and CDR circuitry 265.

Receiver lanes $206_0$ through $206_M$ can operate to extract data information from signals $V_{RX0}$ through $V_{RXM}$, respectively, and provide the extracted data information $DATA_0$ through $DATA_M$ to a functional unit 207 of receiver 206. Each of data information $DATA_0$ through $DATA_M$ can include a number of bits. Functional unit 207 can include circuitry (e.g., logic circuitry, memory cell circuitry, etc.) that can operate to further process data information $DATA_0$, through $DATA_M$. For simplicity, the following description describes mainly the operation of receiver lane 206o. Other receiver lanes of receiver 206 (e.g., receiver lane $206_M$) can have a similar operation.

Equalizer circuitry 210 of receiver lane $206_0$ can include any combination of a continuous-time linear equalizer (CTLE), a feed-forward equalizer (FFE), and a decision feedback equalizer (DFE). Equalizer circuitry 210 can operate to improve the quality of signal $V_{RX0}$ and generate signal (e.g., input signal) $V_{IN0}$. Sampler circuitry 225 can operate to sample signal $V_{IN0}$ based on timing (e.g., phases) of different clock signals (e.g., sampling clock signals) $CLK_0$ through $CLK_i$ and generate data information $d_0$ through $d_n$ and error information (e.g., phase error information) $e_0$ through $e_n$. Each of data information $d_0$ through $d_n$ can include a number of bits. Each of error information $e_0$ through $e_n$ can include values indicating a deviation from expected (e.g., ideal) sampling phases for sampling of signal $V_{IN0}$.

Clock generation circuitry 245 of receiver lane $206_0$ can receive a clock signal (e.g., reference clock signal) $CLK_{REF}$ and generate clock signals $CLK_0$ through $CLK_i$. The timing (e.g., phases) of clock signals $CLK_0$ through $CLK_i$ are different from each other. For example, clock signals $CLK_0$ through $CLK_i$ can be 90 degrees (or a multiple of 90 degrees) out of phase with each other. Signal $CLK_{REF}$ can be provided (e.g., locally provided at receiver 206) by a crystal oscillator or by another type of clock generating device. Clock generation circuitry 245 can include a phase rotator (e.g., any combination of a phase interpolator (PI), a phase locked loop (PLL), a delay locked loop (DLL), and delay lines).

CDR circuitry 265 of receiver lane $206_0$ can operate to receive data information $d_0$ through $d_0$ and error information $e_0$ through $e_n$ and generate control information CTL. Control information CTL can be used to control (e.g., adjust) the timing of clock signals $CLK_0$ through $CLK_i$ in order to correct or reduce phase errors of clock signals $CLK_0$ through $CLK_i$. As described above, clock signals $CLK_0$ through $CLK_i$ are used as timing to extract data information $d_0$ through $d_n$ from signal $V_{IN0}$. Correcting (or reducing phase errors) of clock signals $CLK_0$ through $CLK_i$ improves the accuracy in sampling of signal $V_{IN0}$, thereby improving the accuracy in the values of data information $d_0$ through $d_n$.

In other receiver lanes of receiver 206 (e.g., receiver lane $206_M$), the operations of equalizer circuitry 210, sampler circuitry 225, clock generation circuitry 245, and CDR circuitry 265 are similar to those of receiver lane $206_0$ described above.

Figure 3:
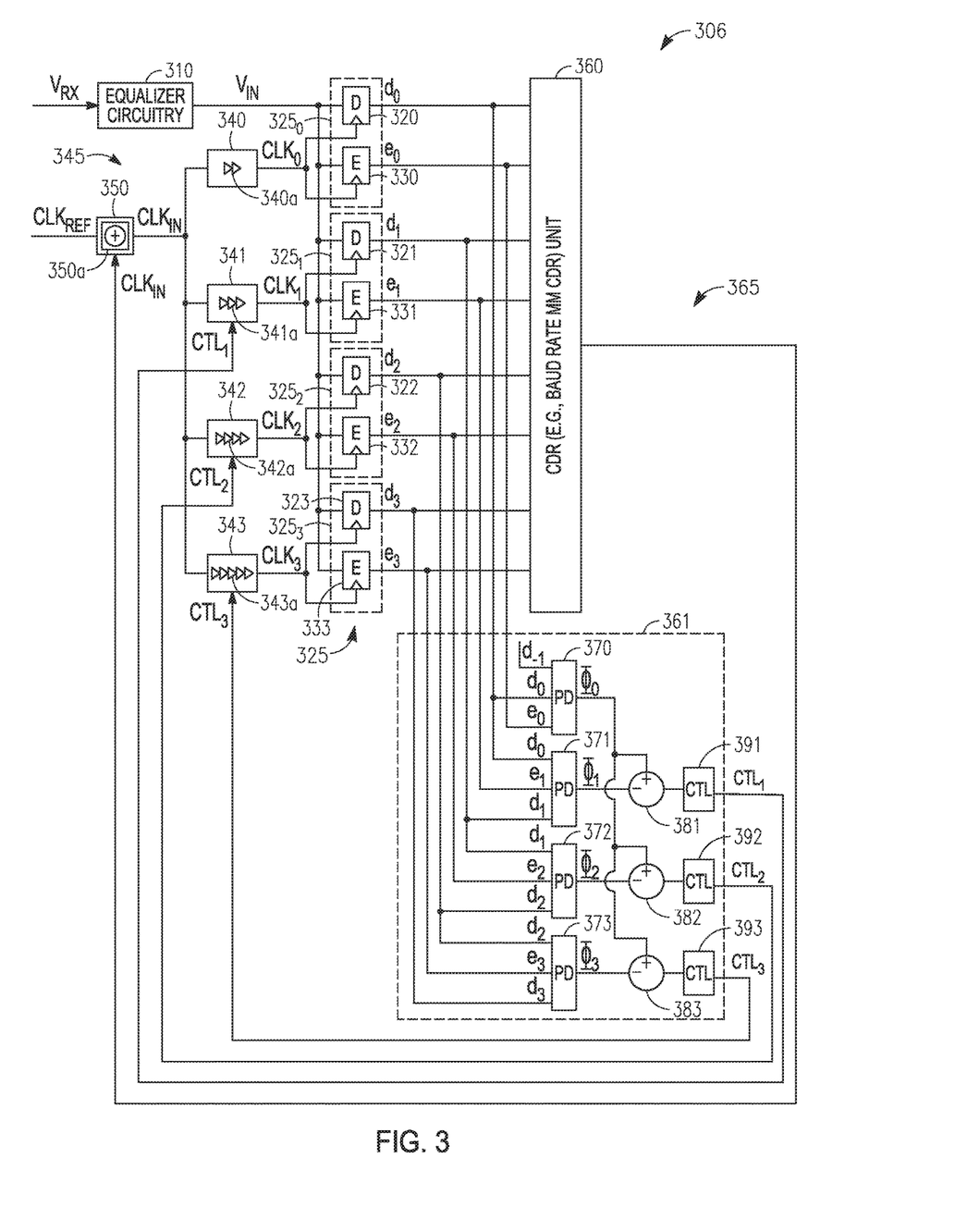
FIG. 3 shows a block diagram of a receiver that employs a CDR-directed clock adjustment technique, according to some embodiments described herein.

FIG. 3 shows a block diagram of a receiver 306 that employs a CDR-directed clock adjustment technique, according to some embodiments described herein. Receiver 306 can include multiple receiver lanes (which can be similar to receiver lanes $206_0$ through $206_M$ of receiver 206 of FIG. 2). For simplicity, only one receiver lane of receiver 306 is shown in FIG. 3.

Receiver 306 can receive a signal $V_{RX}$ (which can correspond to one of signal $V_{RX0}$ through $V_{RXM}$ of FIG. 2) and a clock signal $CLK_{REF}$. As shown in FIG. 3, receiver 306 can include equalizer circuitry 310, sampler circuitry 325 including sampler circuits (e.g., data sampler circuits) 320, 321, 322, and 323 and sampler circuits (e.g., error sampler circuits) 330, 331, 332, and 333, clock generation circuitry 345 including clock generators (e.g., clock phase generators) 340, 341, 342, and 343, and a clock generator (e.g., input clock generator) 350. Receiver 306 can also include CDR circuitry 365 (which can correspond to CDR circuitry 265 of FIG. 2). CDR circuitry 365 can include a CDR unit 360 and a CDR-directed phase error detection unit 361 including phase detector units 370, 371, 372, and 373, summers (e.g., adders) 381, 382, and 383, and control circuits 391, 392, and 393.

Equalizer circuitry 310 can correspond to equalizer circuitry 210 of FIG. 2. Equalizer circuitry 310 can operate to improve the quality of signal $V_{RX}$ and generate signal (e.g., input signal) $V_{IN}$. Sampler circuitry 325 can operate to sample signal $V_{IN}$ based on timing (e.g., phases) of clock signals (e.g., sampling clock signals) $CLK_0$, $CLK_1$, $CLK_2$, and $CLK_3$. Sampler circuitry 325 can generate (e.g., extract) data information do through $d_3$ and error information $e_0$ through $e_3$ from the sampling of signal $V_{IN}$. Each of data information do through $d_3$ can include a number of bits. FIG. 3 shows an example of a 4-way (where N=4) interleaved circuit paths (e.g., circuit slices) of receiver 306 where signal $V_{IN}$ and can be sampled using separate sampler circuits included in four circuit paths (e.g., four circuit slices) $325_0$, $325_1$, $325_2$, and $325_3$.

As shown in FIG. 3, circuit path $325_0$ can include sampler circuits 320 and 330 to sample signal $V_{IN}$ based on timing of clock signal $CLK_0$. Sampler circuits 320 and 330 can provide data information do and error information $e_0$. Circuit path $325_1$ can include sampler circuits 321 and 331 to sample signal $V_{IN}$ based on timing of clock signal $CLK_1$. Sampler circuits 321 and 331 can provide data information $d_1$ and error information $e_1$. Circuit path $325_2$ can include sampler circuits 322 and 332 to sample signal $V_{IN}$ based on timing of clock signal $CLK_2$. Sampler circuits 322 and 332 can provide data information $d_2$ and error information $e_2$. Circuit path $325_3$ can include sampler circuits 323 and 333 to sample signal $V_{IN}$ based on timing of clock signal $CLK_3$. Sampler circuits 323 and 333 can provide data information $d_3$ and error information $e_3$.

FIG. 3 shows receiver 306 having a 4-way (where N=4) interleaved circuit paths (e.g., circuit slices) as an example. However, receiver 306 can include a different number of N-way interleaved circuit paths, where N can be two (N=2) or another integer greater than two (N>2). For example, receiver 306 can include a 2-way (e.g., N=2) interleaved circuit path, such that only two circuit paths (e.g., two circuit slices) among circuit path $325_0$, $325_1$, $325_2$, and $325_3$ are included in each receiver lane of receiver 306, and only two of clock signals $CLK_0$, $CLK_1$, $CLK_2$, and $CLK_3$ are respectively used in those two circuit paths.

As shown in FIG. 3, clock generator 350 can generate clock signal $CLK_{IN}$ based on clock signal $CLK_{REF}$. The frequency of clock signal $CLK_{IN}$ can be greater than the frequency of clock signal $CLK_{REF}$. Signal $CLK_{REF}$ can be provided locally at receiver 306. The frequency of clock signal $CLK_{IN}$ can be based on the data transfer rate of bits carried by signal $V_{IN}$. Clock generator 350 can include a PLL and/or a phase rotator and/or a DLL.

Clock generators 340, 341, 342, and 343 can generate clock signals $CLK_0$, $CLK_1$, $CLK_2$, and $CLK_3$, respectively, based on clock signal $CLK_{IN}$. The frequency of each of clock signals $CLK_0$, $CLK_1$, $CLK_2$, and $CLK_3$ can be the same as the frequency of clock signal $CLK_{IN}$. However, the phases of clock signals $CLK_0$, $CLK_1$, $CLK_2$, and $CLK_3$ can be different from each other. For example, clock signal $CLK_1$ can be 90 degrees out of phase with clock signals $CLK_0$, clock signal $CLK_2$ can be 90 degrees out of phase with clock signals $CLK_1$, and clock signal $CLK_3$ can be 90 degrees out of phase with clock signals $CLK_2$. As an example, each of clock generators 340, 341, 342, and 343 can include a respective delay line (e.g., one of delay lines 340a, 341a, 342a, and 343a), which can include delay elements (e.g., complementary metal-oxide semiconductor (CMOS) buffer inverters) coupled in a chain. Each of delay lines 340a, 341a, 342a, and 343a can delay (e.g., apply a time delay to) clock signal $CLK_{IN}$. Delay lines 340a, 341a, 342a, and 343a can have a different number of delay elements (or the same number of delay elements) that can be controlled (e.g., controlled by the same way or different ways among the delay lines) to apply different amount of time delays to clock signal $CLK_{IN}$, such that signals $CLK_0$, $CLK_1$, $CLK_2$, and $CLK_3$ can have difference phases.

CDR unit 360 of CDR circuitry 365 of receiver 306 can operate to receive data information do through $d_3$ and error information $e_0$ through $e_3$ and generate control information $CTL_{IN}$ (at an output of CDR unit 360) to control (e.g., adjust) the timing (e.g., phase) of signal $CLK_{IN}$. For example, based on the value of control information that $CTL_{IN}$, phase rotator 350a can shift the phase of clock signal $CLK_{IN}$.

CDR-directed phase error detection unit 361 of CDR circuitry 365 of receiver 306 can generate control information $CTL_1$, $CTL_2$, and $CTL_3$ (at an output of CDR-directed phase error detection unit 361) based on data information do through $d_3$ and error information $e_0$ through $e_3$. Clock generator 341, 342, and 343 can use control information $CTL_1$, $CTL_2$, and $CTL_3$ to control (e.g., adjust) the timing (e.g., phases) of clock signals $CLK_1$, $CLK_2$, and $CLK_3$, respectively. Thus, based on the same data information do through $d_3$ and error information $e_0$ through $e_3$. CDR circuitry 365 of receiver 306 can generate control information $CTL_{IN}$ and control information $CTL_1$, $CTL_2$, and $CTL_3$.

Receiver 306 can use control information $CTL_{IN}$ to control the timing of signal $CLK_{IN}$ during an operation of receiving information (e.g., data information in the form of signal $V_{RX}$) transmitted to receiver 306. For example, receiver 306 can use control information $CTL_{IN}$ to control the timing of signal $CLK_{IN}$ during run time when receiver 306 operates to receive signal $V_{RX}$.

Receiver 306 can use control information $CTL_1$, $CTL_2$, and $CTL_3$ to control the timing of clock signals $CLK_1$, $CLK_2$, and $CLK_3$, respectively, during run time when receiver 306 operates to receive signal $V_{RX}$. Alternatively, receiver 306 can use control information $CTL_1$, $CTL_2$, and $CTL_3$ to control the timing of clock signals $CLK_1$, $CLK_2$, and $CLK_3$, respectively, during specific time interval (e.g., a predetermined periodical time interval) or during a specific operating mode of receiver 306. For example, receiver 306 can use control information $CTL_1$, $CTL_2$, and $CTL_3$ to control the timing of clock signals $CLK_1$, $CLK_2$, and $CLK_3$, respectively, during a calibration mode of receiver 306. In this example, receiver 306 may turn off (e.g., disable) CDR-directed phase error detection unit 361 after the calibration mode is completed (e.g., after the phases of clock signals $CLK_1$, $CLK_2$, and $CLK_3$ are adjusted from the clock phase calibration). Alternatively, receiver 306 may keep CDR-directed phase error detection unit 361 turned on after the calibration mode is completed.

Figure 4:
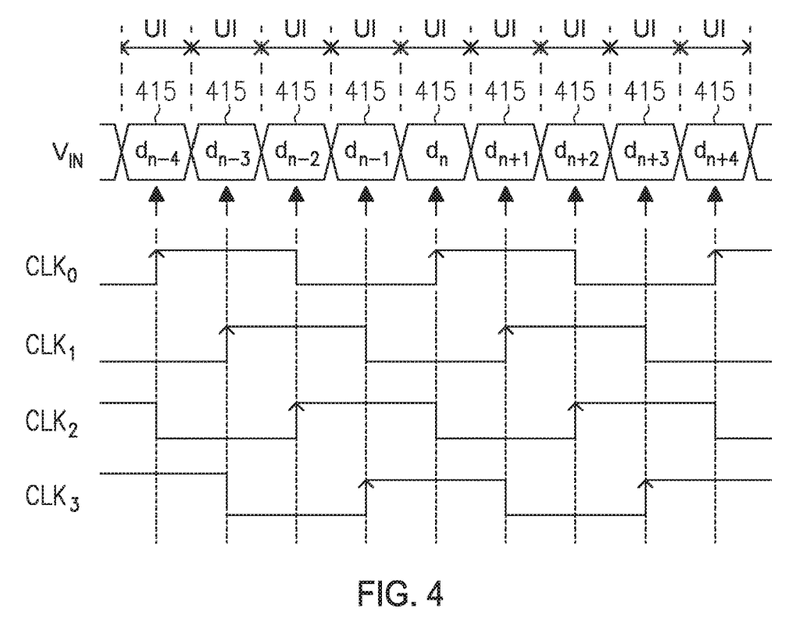
FIG. 4 is a timing diagram showing timing relationships among clock signals and an input signal of FIG. 3, according to some embodiments described herein.

FIG. 4 is a timing diagram showing timing relationships among clock signals $CLK_0$, $CLK_1$, $CLK_2$, and $CLK_3$ and signal $V_{IN}$ of FIG. 3, according to some embodiments described herein. As shown in FIG. 4, signal $V_{IN}$ can include symbols 415. Each of symbols 415 can carry a bit of information among bits $d_{n-4}$ through $d_{n+4}$. One symbol can be transmitted within one unit interval (UI). A total of one bit carried by signal $V_{IN}$ can be transmitted within one unit interval (UI). Thus, in the example of FIG. 4, nine bits (e.g., bits $d_{n-4}$ through $d_{n+4}$) are transmitted in nine respective unit intervals (UIs). FIG. 4 shows an example where each symbol can carry one bit of information. Alternatively, each symbol 415 can carry multiple bits (e.g., a multi-level symbol).

As shown in FIG. 4, clock signals $CLK_0$, $CLK_1$, $CLK_2$, and $CLK_3$ are 90 degrees out of phase from one clock signal to the next. Signal $V_{IN}$ can be sampled by clock signals $CLK_0$, $CLK_1$, $CLK_2$, and $CLK_3$, such that four different symbols (e.g., four bits) 415 can be sampled using four different clock phases (e.g., using four rising edges) of clock signals $CLK_0$, $CLK_1$, $CLK_2$, and $CLK_3$, respectively.

Bits $d_{n-4}$ through $d_{n+4}$ can be sequentially sampled in the order shown in FIG. 4. For example, if bit do is presently being sampled (present bit), then bit $d_{n-1}$ is the previous bit (sampled before bit do is sampled) and bit $d_{n+1}$ is the next bit (sampled after bit $d_n$ is sampled). In another example, if bit $d_{n-3}$ is presently being sampled, then bit $d_{n-4}$ is the previous bit (sampled before bit $d_{n-3}$ is sampled) and bit $d_{n-2}$ is the next bit (sampled after bit $d_{n-3}$ is sampled). The bits (e.g., bits $d_{n-4}$ through $d_{n+4}$) carried by signal $V_{IN}$ can be extracted by sampler circuitry 325 of receiver 306 (FIG. 3) based on timing of clock signals $CLK_0$, $CLK_1$, $CLK_2$, and $CLK_3$, in which their phase errors can be corrected based on control information $CTL_{IN}$ (generated by CDR unit 360) and control information $CTL_1$, $CTL_2$, and $CTL_3$ (generated by CDR-directed phase error detection unit 361).

Referring to FIG. 3, CDR unit 360 can be implemented based on baud-rate CDR scheme (e.g., the baud-rate Mueller and Muller CDR scheme). CDR-directed phase error detection unit 361 can be implemented based on a new baud-rate CDR scheme (e.g., a modified baud-rate Mueller and Muller CDR scheme).

The following describes the baud-rate Mueller and Muller CDR scheme implemented in CDR unit 360. As is known to those skilled in the art, baud-rate phase detectors use consecutive bits ($d_k$) to extract phase information. For example, a conventional baud-rate Mueller and Muller CDR scheme requires consecutive bits information for construction of the timing error function, as shown in equation [1] below.

$$\theta_{MM}(n) = h(\tau+T) - h(\tau-T) \sim x_n d_{n-1} - x_{n-1} d_n \quad [1]$$

If dm is the sign of transmitted signal $\{+1,-1\}$, h(t) is the pulse response of the channel, and T is the unit interval (UI), then the received data x(t) is $$x(t) = \sum_m d_m h(t - mT)$$

A $k^{th}$ sample taken at time ($\tau+kT$), with $\tau$ being the sampling phase, the sampled voltage is given as $$x(k) = x(\tau + kT) = \sum_j d_{n-j} h(jT + \tau)$$

By multiplying the sampled voltage with recovered data and taking the expectation, E{.}, the phase detector (e.g., CDR unit 360) output is given as $$\phi_{MM}(n) =$$

$$E\{x_n d_{n-1} - x_{n-1} d_n\} = E\left\{\sum_j d_{n-j} d_{n-1} h(\tau + jT) - \sum_j d_{n-j-1} d_k h(\tau + jT)\right\}$$

$$\phi_{MM}(n) = h(\tau + T) - h(\tau - T) \sim x_n d_{n-1} - x_{n-1} d_n$$

A Sign-sign implementation with extra 2 error samplers would translate equation [1] to the following equation with "e" being the sign of the error with respect to a predefined reference voltage threshold.

$$\phi_{SSMM}(n) = d_n d_{n-1}(e_n - e_{n-1}) \quad [2]$$

Both equations [1] and [2] are conventional approaches to baud-rate CDR that needs recovered data and error information from every consecutive data bit.

The general concept of baud-rate CDR scheme (described above) is to match features on the pulse response to center the timing estimate, such as forcing precursor and postcursor equality. In a linear-time-invariant (LTI) system, the precursor and postcursor can be reliably extracted from the incoming bit stream, even in the presence of zero-mean noise, jitter and crosstalk. This infers that consecutive error information may be unnecessary.

The following description describes a new baud-rate CDR scheme (e.g., a modified baud-rate Mueller and Muller CDR scheme) that can be implemented in CDR-directed phase error detection unit 361 of FIG. 3. From equation [1] above, the precursor $h(\tau+T)$ can be extracted from $E\{(x_n d_{n-1})\}$. The postcursor can be extracted from the $D^{th}$ sample in an LTI system. If the $D^{th}$ sample is multiplied by the $(D+1)^{th}$ data, the expectation will also yield the $h(\tau-T)$ information.

$$E\{x_{n-D} d_{n-D+1}\} = E\left\{\sum_j d_{n-D-j} d_{n-D-1} h(\tau + jT)\right\} \sim h(\tau - T) \quad [3]$$

With the postcursor extracted from $D^{th}$ bit, from equation [3], a new baud-rate CDR scheme and a Sign-Sign variant are derived based on Equations [4] and [5] as follow.

$$\phi_{newMM} = E\{x_n d_{n-1} - x_{n-D} d_{n-D+1}\} \quad [4]$$

$$\phi_{newSSMM}(n) = d_n d_{n-1}(e_n+1) - d_{n-D+1} d_{n-D}(e_{n-D}+1) \quad [5]$$

Each of equations [4] and [5] can be referred to as a modified Mueller and Muller baud-rate clock and data recovery equation.

Equation [5] shows that for a timing estimate for an interleaved system (e.g., an N-way interleaved receiver lane in FIG. 3), the critical error samplers may be needed only for every D unit intervals (UIs). Since the recovered data "d" is extracted for every UI (for a successful communication link), $d_{n-1}$ and $d_{n-D+1}$ are always available. If the "D" is made the same as "N" in an N-way interleaved receiver lane of receiver 306 of FIG. 3, then the voltage or error information can be extracted on the same clock phase. This means that the phase to phase spacing error is no longer in the CDR equation. This leads to a new baud-rate CDR scheme that can be implemented in CDR-directed phase error detection unit 361 of FIG. 3.

In FIG. 3, CDR-directed phase error detection unit 361 can operate based on the new baud-rate CDR scheme (e.g., a modified baud-rate Mueller and Muller CDR scheme) outlined in equations [4] and [5] to provide control information (e.g., control information $CTL_1$, $CTL_2$, and $CTL_3$) to correct the phase spacing error in an N-way interleaved receiver lane of receiver 306. In the case of D=N (e.g., D=N=4), the new baud-rate CDR scheme extracts timing information from only each of circuit paths (e.g., each of circuit slices) $325_0$, $325_1$, $325_2$, and $325_3$. As shown in FIG. 3, each of circuit paths $325_0$, $325_1$, $325_2$, and $325_3$ takes in only one clock phase (e.g., one of clock signals $CLK_0$, $CLK_1$, $CLK_2$, and $CLK_3$).

In FIG. 3, CDR unit 360 can operate as a master baud-rate CDR (e.g., as a master baud-rate Mueller and Muller CDR) that can use a Mueller and Muller phase detector ($x_n d_{n-1} - x_{n-1} d_n$). As described above, based on data information do through $d_3$ and error information $e_0$ through $e_3$ provided by sampler circuitry 325, CDR unit 360 can generate control information (e.g., based on Equations [1] and [2] above) to control the timing (e.g., phase) of clock signal $CLK_{IN}$ generated by clock generator 350.

CDR-directed phase error detection unit 361 of receiver 306 can operate based on the new baud-rate CDR scheme (e.g., a modified baud-rate Mueller and Muller CDR scheme) outlined in equations [4] and [5]. For example, phase detector units 370, 371, 372, and 373 can be implemented using equations [4] and [5] to generate phase error information $\Phi_0$, $\Phi_1$, $\Phi_2$, and $\Phi_3$ at their respective output. Each of phase error information $\Phi_0$, $\Phi_1$, $\Phi_2$, and $\Phi_3$ corresponds to its own clock phase relationship with the incoming data. Summers 381, 382, and 383 can operate to provide the difference in values between the phase error information from one circuit path (circuit slice) to another circuit path (another circuit slice). Each of control circuits 391, 392, and 393 can include a filter and a state machine (e.g., a finite state machine). Based on the results from summers 381, 382, and 383, control circuits 391, 392, and 393 can operate to provide control information $CTL_1$, $CTL_2$, and $CTL_3$. Based on respective control information $CTL_1$, $CTL_2$, and $CTL_3$, delay lines 341a, 342a, and 343a can control (e.g., can adjust by increasing or decreasing) the amount of time delay applied to signal $CLK_{IN}$ passing through delay lines 341a, 342a, and 343a. This can correct or reduce phase errors between clock signals $CLK_0$, $CLK_1$, $CLK_2$, and $CLK_3$.

Receiver 306 can be configured such that CDR-directed phase error detection unit 361 can be used to calibrate phases of clock signals $CLK_0$, $CLK_1$, $CLK_2$, and $CLK_3$ during run-time of receiver 306. For example, CDR-directed phase error detection unit 361 can be used to calibrate phases of clock signals $CLK_0$, $CLK_1$, $CLK_2$, and $CLK_3$ one time (e.g., only one time after power-up mode of receiver 306). After the calibration (e.g., only one time calibration), CDR-directed phase error detection unit 361 can be turned off (and turned on at the next power up, for example). In another example, CDR-directed phase error detection unit 361 can be used to calibrate phases of clock signals $CLK_0$, $CLK_1$, $CLK_2$, and $CLK_3$ multiple times. In this example, CDR-directed phase error detection unit 361 can be configured (e.g., programmed) to perform the calibrations after a specific time interval has lapsed (e.g., periodically perform the calibration).

Figure 5A:
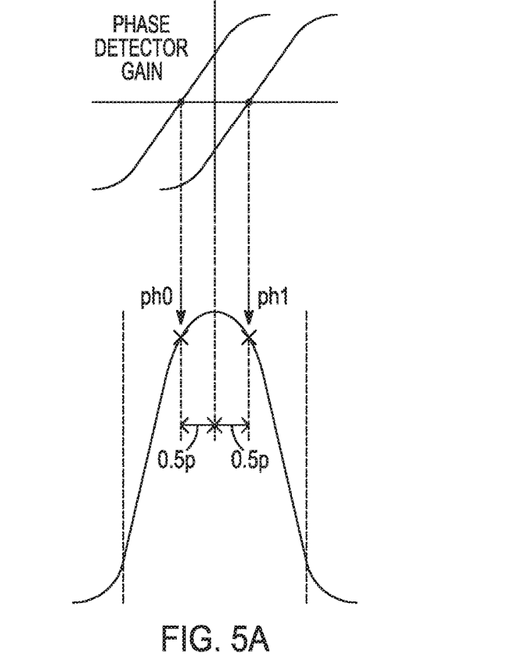
FIG. 5A is a graph illustrating example phase errors of clock signals (e.g., sampling clock signals) in the receiver of FIG. 3, according to some embodiments described herein.

FIG. 5A is a graph illustrating example phase error of clock signals (e.g., sampling clock signals) in receiver 306 of FIG. 3, according to some embodiments described herein. FIG. 3 shows a 4-way interleaved receiver lane of receiver 306. For simplicity, the following discussion of the clock phase calibration concept uses an example of 2-way interleaved receiver lane (e.g., N=M=2). In this example, two clock signals (e.g., two clock signals similar to clock signals $CLK_0$, $CLK_1$, $CLK_2$, and $CLK_3$) are used in the 2-way interleaved receiver. In FIG. 5A, the clock phases of the two example clock signals are indicated as ph0 and ph1. In this example, the phase error between the two clock phases can cause CDR unit 360 to achieve a steady state when the CDR information of both clock phases ph0 and ph1 cancel out each other. If the phase error between the two clock phases is "p", then each of the two clock phases will be sampled "0.5*p" away from an ideal sampling point, as shown in FIG. 5A.

Figure 5B:
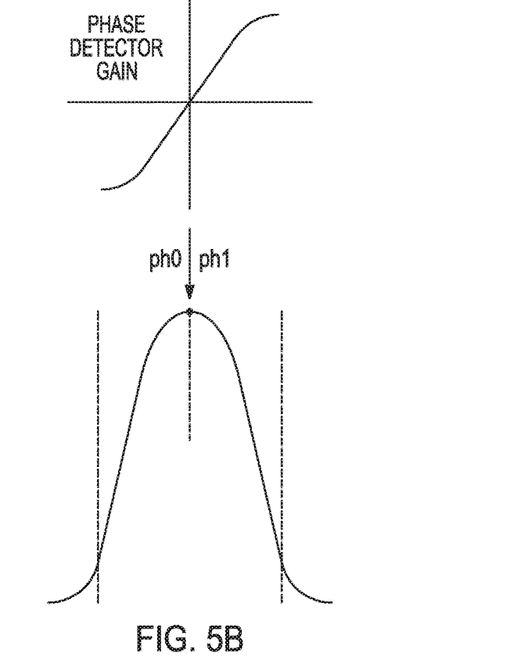
FIG. 5B is a graph illustrating the effect on phase errors after the operation of CDR-directed phase error detection unit of the receiver of FIG. 3, according to some embodiments described herein.

FIG. 5B is a graph illustrating the effect of the operation of CDR-directed phase error detection unit 361 that can provide control information to correct the phase error of clock signals (e.g., sampling clock signals) in receiver 306 of FIG. 3, according to some embodiments described herein. FIG. 5B shows the effect of CDR-directed phase error detection unit 361 on the phase error two clock phases. CDR-directed phase error detection unit 361 (FIG. 3) can calibrate the clock phase by subtracting the phase error information (e.g., $\Phi_0$ and $\Phi_1$) at corresponding outputs of two phase detectors (e.g., two of phase detector units 370, 371, 372, and 373 in FIG. 3). By defining phase error information (o as the point of reference, the phase error between the two clock phases in this example can be estimated from $\Phi_0$-$\Phi_1$ (the difference between $\Phi_0$-$\Phi_1$). The final settling point of the clock phase calibration can be achieved after the estimate of $\Phi_0$-$\Phi_1$ is equal to 0, as shown in FIG. 5B.

The above discussion using an example where N=2 (e.g., 2-way interleaved receiver lane) and using two corresponding clock phases. However, the same or similar concept can be extended to a different value of N and corresponding N clock phases by correcting phase error with respect to $\Phi_0$, such as (in a N=4 interleaved receiver) correcting the phase error between $\Phi_1$ and $\Phi_0$ (e.g., $\Phi_1$-$\Phi_0$), between $\Phi_2$ and $\Phi_0$ (e.g., $\Phi_2$-$\Phi_0$), and between $\Phi_3$ and $\Phi_0$ (e.g., $\Phi_3$-$\Phi_0$).

The techniques described herein include improvement over some conventional techniques. For example, some conventional techniques for clock phase calibration in interleaved receivers often add extra high speed clock paths to calibration circuitry, which can include extra buffers, phase error detection, sense-amplifier and logic state machine. These extra high speed circuits are susceptible to random process variations. Thus, the final calibrated value in such conventional techniques can include errors not on the actual data path and CDR paths. Therefore, some conventional techniques can suffer from residual phase errors that reduce the overall timing margin. As described above (e.g., the operations of receiver 306 in FIG. 3), the techniques described herein use the timing recovery function from the same information (e.g., data information $d_0$ through $d_3$ and error information $e_0$ through $e_3$) in data paths of the receiver to optimize each clock phase. Thus, random process variation can be avoided and residual phase errors may be non-existent. This can lead to improved overall timing margin in comparison with some conventional techniques.

Further, in some conventional techniques, the extra high speed clock path used for the clock phase calibration can add a significant amount of noise to the overall system (e.g., through increased current (di/dt) or direct coupling). Therefore, many conventional receivers are designed such that clock phase calibration may run only during initial boot and/or during low power state. As a result, conventional calibration techniques for calibrating clock phases may suffer from variations in operating temperature and voltage (e.g., variations in temperature and voltage after the clock phase calibration in the initial boot). Thus, any phase errors occurring after clock phase calibration (e.g., due to variations in temperature and voltage) may still occur in the receivers used in conventional techniques.

Some other conventional clock phase calibration run the calibration either at all times during operations of the receiver or periodically during run time but have to manage the noise generated by the extra circuitry used for the calibration. The noise could cause overall jitter increase through the supply power noise.

The techniques described herein can perform the clock phase calibration mostly in the digital domain (e.g., without new analog hardware) which draws significantly lower current and supply noise induced jitter in comparison with some analog conventional clock phase calibrations. Therefore, the described clock phase calibration circuitry (e.g., CDR-directed phase error detection unit 361 of FIG. 3) described herein can be run during active traffic of receiver 306 without much impact to overall jitter. The described clock phase calibration circuitry can also track changes in the power supply profile and adjust the clock phase accordingly.

Figure 6:
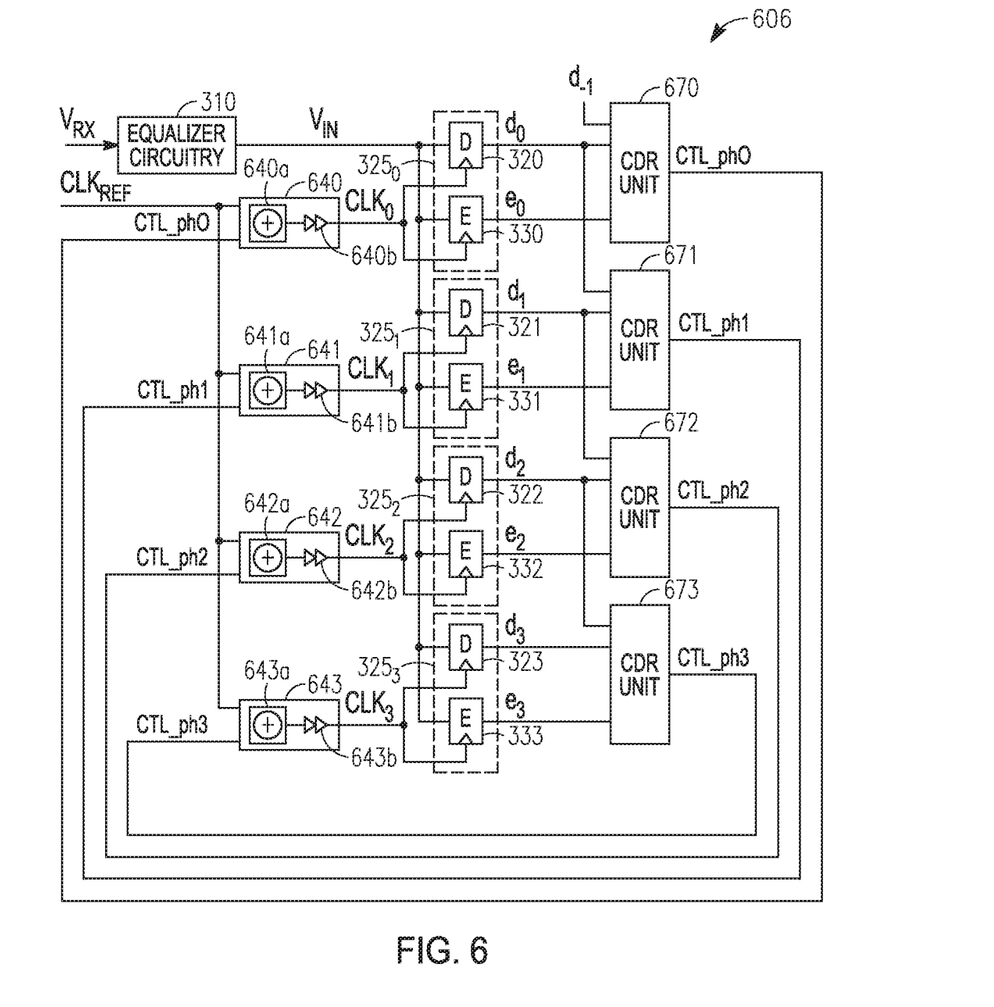
FIG. 6 shows a block diagram of a receiver that employs a CDR-directed clock adjustment technique including multiple CDR units, according to some embodiments described herein.

FIG. 6 shows a block diagram of a receiver 606 that employs a CDR-directed clock adjustment technique including multiple CDR units, according to some embodiments described herein. Some of components of receiver 606 can be similar to, or the same as, those of receiver 306. Thus, for simplicity, similar or identical components are given the same labels and their descriptions are not repeated. Receiver 606 can employ a new CDR scheme (e.g., a modified baud-rate Mueller and Muller CDR scheme) described above with reference to FIG. 3 through FIG. 5B. However, in FIG. 6, receiver 606, each of circuit paths (e.g., circuit slices) $325_0$, $325_1$, $325_2$, and $325_3$ can have its own CDR unit that is configured with the new CDR scheme.

Receiver 606 can include CDR units 670, 671, 672, and 673 to generate respective control information $CTL\_ph_0$, $CTL\_ph_1$, $CTL\_ph_2$, and $CTL\_ph_3$ based on respective data information $d_{-1}$ through $d_3$ and error information $e_0$ through $e_3$, as shown in FIG. 6. Circuit paths $325_0$, $325_1$, $325_2$, and $325_3$ can operate to sample signal $V_{IN}$ based on timing of clock signals $CLK_0$, $CLK_1$, $CLK_2$, and $CLK_3$, respectively.

As shown in FIG. 6, receiver 606 can include clock generators 640, 641, 642, and 643 to generate clock signals $CLK_0$, $CLK_1$, $CLK_2$, and $CLK_3$ based on clock signal $CLK_{REF}$. Each of clock generators 640, 641, 642, and 643 can include a phase rotator and a driver (e.g., CMOS driver). For example, clock generators 640, 641, 642, and 643 can include phase rotators 640a, 641a, 642a, and 643a, respectively, and drivers 640b, 641b, 642b, and 643b, respectively. Clock generators 640, 641, 642, and 643 can use control information $CTL\_ph_0$, $CTL\_ph_1$, $CTL\_ph_2$, and $CTL\_ph_3$ to control (e.g., adjust) the timing (e.g., phases) of clock signals $CLK_1$, $CLK_2$, and $CLK_3$, respectively.

Each of control information $CTL\_ph_0$, $CTL\_ph_1$, $CTL\_ph_2$, and $CTL\_ph_3$ can be generated based on equations [4] and [5] (e.g., a modified Mueller and Muller baud-rate clock and data recovery equations).

FIG. 6 shows an example of N-way interleaved receiver lane of receiver 606 where N is made equal to "D" of Equation [5]. Thus, the timing information embedded in the analog voltage, $x_k$, or the error $e_k$ (from error samplers) is sampled with the same clock phase. This means that the CDR sampling phase movement may be unaffected by the clock phase spacing error. As shown in FIG. 6, each of clock phases can have its own CDR unit that is locking using its own phase only. The recovered information $d_{n-1}$ and $d_n$ are readily available data information and the sampling can be more robust as only the sign may be needed. Sign data from previous bits will be sampled by its previous CDR self-aligned clock and therefore can be considered to be robust. Receiver 606 can also have improvements similar to those of receiver 306 described above.

Figure 7:
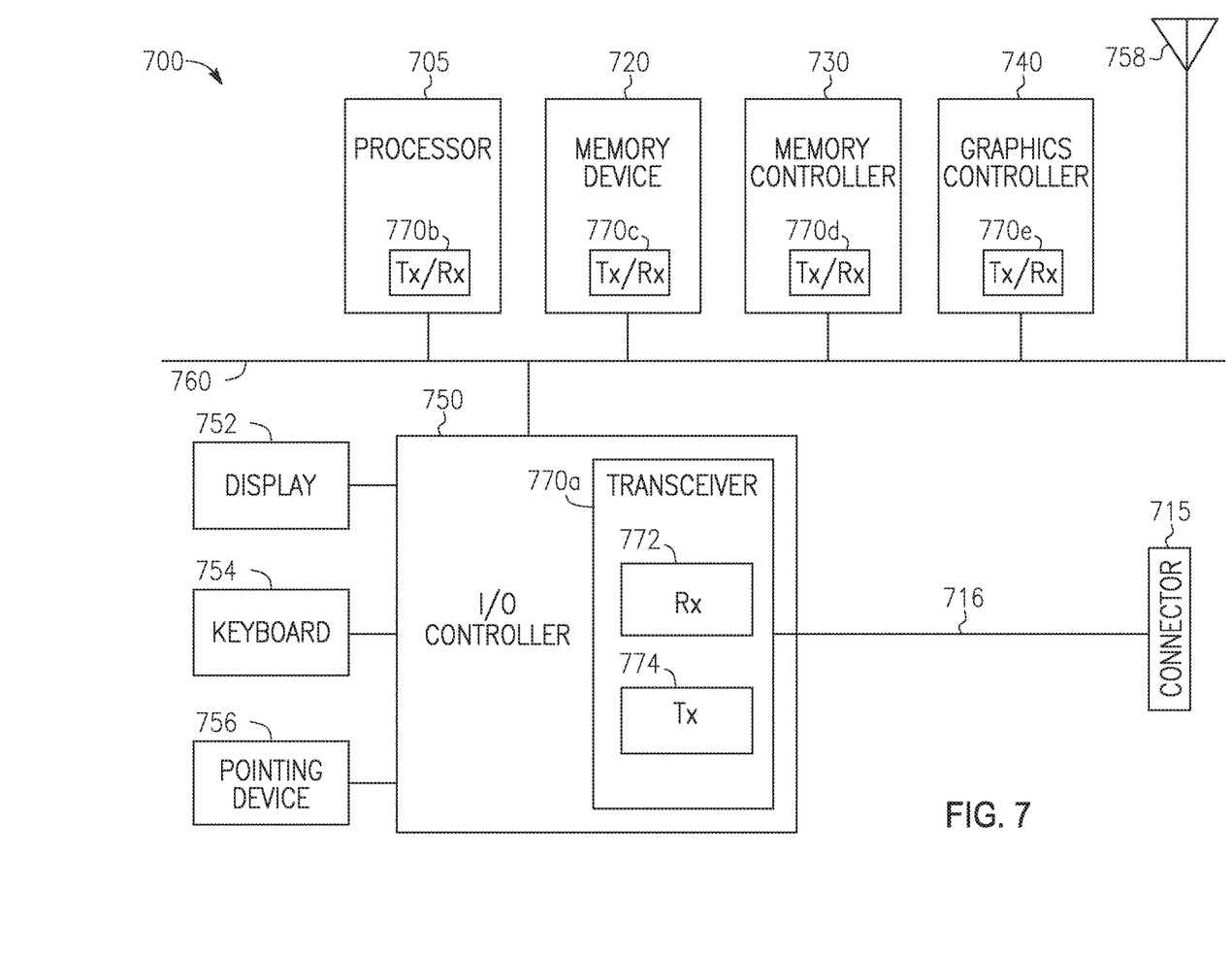
FIG. 7 shows an apparatus in the form of a system (e.g., electronic system), according to some embodiments described herein.

FIG. 7 shows an apparatus in the form of a system (e.g., electronic system) 700, according to some embodiments described herein. System 700 can include or be included in a computer, a tablet, or other electronic systems. As shown in FIG. 7, system 700 can include a processor 705, a memory device 720, a memory controller 730, a graphics controller 740, an input and output (I/O) controller 750, a display 752, a keyboard 754, a pointing device 756, at least one antenna 758, a connector 715, and a bus 760.

Each of processor 705, memory device 720, memory controller 730, graphics controller 740, and I/O controller 750 can include an IC such as device 101 or 102 (FIG. 1).

In some arrangements, system 700 does not have to include a display. Thus, display 752 can be omitted from system 700. In some arrangements, system 700 does not have to include any antenna. Thus, antenna 758 can be omitted from system 700.

Processor 705 may include a general-purpose processor or an application specific integrated circuit (ASIC).

Memory device 720 may include a dynamic random access memory (DRAM) device, a static random access memory (SRAM) device, a flash memory device, or a combination of these memory devices. FIG. 7 shows an example where memory device 720 is a stand-alone memory device separated from processor 705. In an alternative arrangement, memory device 720 and processor 705 can be located on the same die. In such an alternative arrangement, memory device 720 is an embedded memory in processor 705, such as embedded DRAM (eDRAM), embedded SRAM (eSRAM), embedded flash memory, or another type of embedded memory.

Display 752 can include a liquid crystal display (LCD), a touchscreen (e.g., capacitive or resistive touchscreen), or another type of display. Pointing device 756 can include a mouse, a stylus, or another type of pointing device.

I/O controller 750 can include a communication module for wired or wireless communication (e.g., communication through one or more antenna 758). Such wireless communication may include communication in accordance with WiFi communication technique, Long Term Evolution Advanced (LTE-A) communication technique, or other communication techniques.

I/O controller 750 can also include a module to allow system 700 to communicate with other devices or systems in accordance with to one or more of the following standards or specifications (e.g., I/O standards or specifications), including Universal Serial Bus (USB), DisplayPort (DP), High-Definition Multimedia Interface (HDMI), Thunderbolt, Peripheral Component Interconnect Express (PCIe), Ethernet, and other specifications.

Connector 715 can be arranged (e.g., can include terminals, such as pins) to allow system 700 to be coupled to an external device (or system). This may allow system 700 to communicate (e.g., exchange information) with such a device (or system) through connector 715. Connector 715 may be coupled to I/O controller 750 through a connection 716 (e.g., a bus).

Connector 715, connection 716, and at least a portion of bus 760 can include conductive lines that conform with at least one of USB, DP, HDMI, Thunderbolt, PCIe, Ethernet, and other specifications.

I/O controller 750 can include a transceiver (Tx/Rx) 770a having a receiver (Rx) 772 and a transmitter (Tx) 774. Transmitter 774 can operate to transmit information from I/O controller 750 to another part of system 700 or to an external device (or system) coupled to connector 715. Receiver 772 can operate to allow I/O controller 750 to receive information from another part of system 700 or from an external device (or system) coupled to connector 715. Receiver 772 can include any of the receivers described above with reference to FIG. 1 through FIG. 6.

As shown in FIG. 7, processor 705, memory device 720, memory controller 730, and graphics controller 740 can include transceivers 770b, 770c, 770d, and 770e, respectively, to allow each of these components to transmit and receive information through their respective transceiver. At least one of transceivers 770b, 770c, 770d, and 770e can be similar to or identical to transceiver 770a. Thus, at least one of transceivers 770b, 770c, 770d, and 770e can include a receiver similar to or identical to receiver 772. For example, at least one of transceivers 770b, 770c, 770d, and 770e can include a receiver that can be arranged to allow at least one of processor 705, memory device 720, memory controller 730, and graphics controller 740 to receive information (e.g., signals) from another part of system 700 or from an external device (or system) coupled to connector 715.

FIG. 7 shows the components of system 700 arranged separately from each other as an example. For example, each of processor 705, memory device 720, memory controller 730, graphics controller 740, and I/O controller 750 can be located on a separate die (e.g., semiconductor die or an IC chip). In some arrangements, two or more components (e.g., processor 705, memory device 720, graphics controller 740, and I/O controller 750) of system 700 can be located on the same die (e.g., same IC chip) that forms a system-on-chip (SoC).

Figure 8:
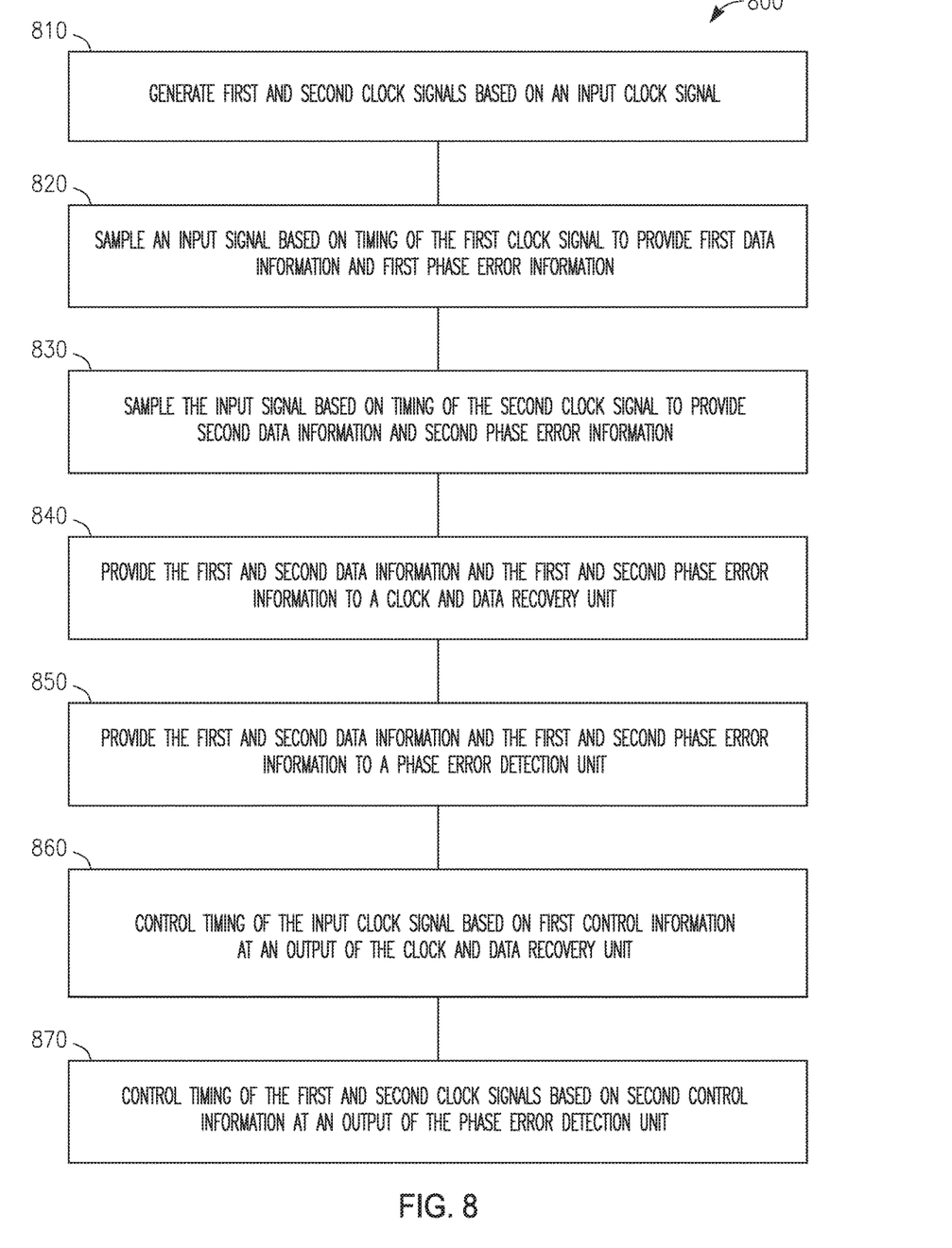
FIG. 8 is a flowchart showing a method of operating a receiver, according to some embodiments described herein.

FIG. 8 is a flowchart showing a method 800 of operating an apparatus, according to some embodiments described herein. The apparatus used in method 800 can include any of the apparatuses (e.g., apparatus 100 and system 700 including the receiver and its components) described above with reference to FIG. 1 through FIG. 7. Some of the activities in method 800 may be performed by hardware, software, firmware, or any combination of hardware, software, and firmware. For example, some of the activities in method 800 may be performed by hardware, software, firmware, or any combination of hardware, software, and firmware implemented in CDR circuitry 265 and 365 of the apparatus (e.g., apparatus 100). The receiver used in method 800 can include any of the receivers described above with reference to FIG. 1 through FIG. 7.

As shown in FIG. 8, activity 810 of method 800 can include generating a first clock signal and a second clock signal based on an input clock signal. Activity 820 can include sampling an input signal based on timing of a first clock signal to provide first data information and first phase error information. Activity 830 can include sampling the input signal based on timing of a second clock signal to provide second data information and second phase error information. Activity 840 can include providing the first and second data information and the first and second phase error information to a clock and data recovery unit. Activity 850 can include providing the first and second data information and the first and second phase error information to a phase error detection unit. Activity 860 can include controlling timing of the input clock signal based on first control information at an output of the clock and data recovery unit. Activity 870 can include controlling timing of the first and second clock signals based on second control information at an output of the phase error detection unit.

Method 800 can include fewer or more activities relative to activities 810, 820, 830, and 840 shown in FIG. 8. For example, method 800 can include activities and operations of any of the receivers and their components described above with reference to FIG. 1 through FIG. 7.

The illustrations of the apparatuses (e.g., apparatus 100 and system 700 including receivers 106, 306, and 606) and methods (e.g., method 800 and operations of apparatus 100 and system 700 including operations of receivers 106, 306, and 606) described above are intended to provide a general understanding of the structure of different embodiments and are not intended to provide a complete description of all the elements and features of an apparatus that might make use of the structures described herein.

The apparatuses and methods described above can include or be included in high-speed computers, communication and signal processing circuitry, single-processor modules or multi-processor modules, single embedded processors or multiple embedded processors, multi-core processors, message information switches, and application-specific modules including multilayer or multi-chip modules. Such apparatuses may further be included as sub-components within a variety of other apparatuses (e.g., electronic systems), such as televisions, cellular telephones, personal computers (e.g., laptop computers, desktop computers, handheld computers, etc.), tablets (e.g., tablet computers), workstations, radios, video players, audio players (e.g., MP3 (Motion Picture Experts Group, Audio Layer 3) players), vehicles, medical devices (e.g., heart monitors, blood pressure monitors, etc.), set top boxes, and others.

Additional Notes and Examples

Example 1 includes subject matter (such as a device, an electronic apparatus (e.g., circuit, electronic system, or both), or a machine) including clock generation circuitry to generate a first clock signal and a second clock signal based on an input clock signal, the first and second clock signals having different phases, sampler circuitry to sample an input signal based on timing of the first and second clock signals and provide data information and error information associated with sampling of the input signal, a clock and data recovery unit to generate first control information based on the data information and the error information, and a phase error detection unit to generate second control information based on the data information and the error information, the clock generation circuitry to control timing of the input clock signal based on the first control information and to control timing of the first and second clock signals based on the second control information.

In Example 2, the subject matter of Example 1 may optionally include, wherein sampler circuitry include first sampler circuits having inputs to receive the input signal, and second sampler circuits having inputs to receive the input signal, and the phase detection unit includes a first phase detector having inputs coupled to outputs of the first sampler circuits, and a second phase detector having inputs coupled to outputs of the second sampler circuits.

In Example 3, the subject matter of Example 2 may optionally include, wherein the phase error detection unit includes a first summer coupled to the first phase detector, and a second summer coupled to the second phase detector.

In Example 4, the subject matter of Example 1 or 2 may optionally include, wherein the clock generation circuitry includes a phase rotator to receive the first control information in order to adjust timing of the input clock signal.

In Example 5, the subject matter of Example 4 may optionally include, wherein the clock generation circuitry includes a first delay line to generate the first clock signal, and second delay line to generate the second clock signal, and the first and second delay lines are to adjust timing of the first and second clock signals, respectively, based on the second control information.

In Example 6, the subject matter Example 1 may optionally include, wherein the clock and data recovery unit includes a baud-rate clock and data recovery unit.

Example 7 includes subject matter (such as a device, an electronic apparatus (e.g., circuit, electronic system, or both), or a machine) including an input to receive an input signal, an input clock generator to generate an input clock signal, first and second clock generators to generate a first clock signal and a second clock signal, respectively, based on the input clock signal, the first and second clock signals having different phases, sampler circuitry to sample the input signal based on timing of the first and second clock signals and provide data information and error information associated with the sampling of the input signal, a clock and data recovery unit to generate first control information based on the data information and the error information and provide the first control information to the first clock generator, and a phase error detection unit to generate second control information based on the data information and the error information and to provide the second control information to the first and second clock generators.

In Example 8, the subject matter of Example 7 may optionally include, wherein the first and second clock generators are to generate the first clock signal having a first phase difference with the input clock signal and to generate the second clock signal having a second phase difference with the input clock signal, and at least one of the first and second phase differences is a multiple of 90 degrees.

In Example 9, the subject matter of Example 7 or 8 may optionally include, wherein the first and second clock generators include a first delay line to delay the input clock signal in order to generate the first clock signal, and a second delay line to delay the input clock signal in order to generate the second clock signal.

In Example 10, the subject matter of Example 9 may optionally include, wherein the first delay line is to delay the input clock signal by an amount of delay based on a value of a first portion the second control information, and the second delay line is to delay the input clock signal by an amount of delay based on a value of a second portion of the second control information.

In Example 11, the subject matter of Example 7 may optionally include, wherein the sampler circuitry includes a first circuit path to sample the input signal based on timing of the first clock signal and provide a first portion of the data information and a first portion of error information, and a second circuit path to sample the input signal based on timing of the second clock and provide a second portion of the data information and a second portion of the error information.

In Example 12, the subject matter of Example 11 may optionally include, wherein each of the first and second circuit path include a first sampler circuit to sample the input signal and a second sampler circuit to sample the input signal.

Example 13 includes subject matter (such as a device, an electronic apparatus (e.g., circuit, electronic system, or both), or a machine) including an input to receive an input signal, a first clock generator to generate a first clock signal based on a reference clock signal, a second clock generator to generate a second clock signal based on the reference clock signal, a first circuit path to sample the input signal based on timing of the first clock signal and provide first data information and first error information associated with the sampling of the input signal, a second circuit path including to sample the input signal based on timing of the second clock signal and provide second data information and second error information associated with the sampling of the input signal, a first clock and data recovery unit to generate first control information based on the first data information and the first error information and provide the first control information to the first clock generator, and a second clock and data recovery unit to generate second control information based on the second data information and the second error information and provide the first control information to the first clock generator.

In Example 14, the subject matter of Example 13 may optionally include, wherein the first clock generator includes a first phase rotator to generate the first clock signal based on a reference clock signal, and the second clock generator includes a second phase rotator to generate the second clock signal based on the reference clock signal.

In Example 15, the subject matter of Example 14 may optionally include, wherein the first and second clock generators are to generate the first and second clock signals, such that the first and second clock signals are an integer multiple of 90 degrees out of phase with each other.

In Example 16, the subject matter of Example 13 may optionally include, wherein each of the first and second clock and data recovery units is implemented by a modified Mueller and Muller baud-rate clock and data recovery equation.

Example 17 includes subject matter (such as a device, an electronic apparatus (e.g., circuit, electronic system, or both), or a machine) including conductive lines on a circuit board, a first device coupled to the conductive lines, and a second device coupled to the conductive lines, the second device including a receiver to receive signals transmitted on the conductive lines by the first device, the receiver including clock generation circuitry to generate a first clock signal and a second clock signal based on an input clock signal, the first and second clock signals having different phases, sampler circuitry to sample an input signal based on timing of the first and second clock signals and provide data information and error information associated with sampling of the input signal, a clock and data recovery unit to generate first control information based on the data information and the error information, and a phase error detection unit to generate second control information based on the data information and the error information, the clock generation circuitry to control timing of the input clock signal based on the first control information and to control timing of the first and second clock signals based on the second control information.

In Example 18, the subject matter of Example 17 may optionally include, wherein the clock and data recovery unit includes a baud-rate clock and data recovery unit, and the phase detector is implemented by a modified Mueller and Muller baud-rate clock and data recovery equation.

In Example 19, the subject matter of Example 17 or 18 may optionally include, wherein one of the devices includes an integrated circuit chip.

In Example 20, the subject matter of Example 17 or 18 may optionally include, wherein the conductive lines conform with at least one of Universal Serial Bus (USB), DisplayPort (DP), High-Definition Multimedia Interface (HDMI), Thunderbolt, Ethernet, and Peripheral Component Interconnect Express (PCIe) specifications.

Example 21 includes subject matter (such as a method of operating a device, an electronic apparatus (e.g., circuit, electronic system, or both), or a machine) including generating a first clock signal and a second clock signal based on an input clock signal, sampling an input signal based on timing of the first clock signal to provide first data information and first phase error information, sampling the input signal based on timing of the second clock signal to provide second data information and second phase error information, providing the first and second data information and the first and second phase error information to a clock and data recovery unit, providing the first and second data information and the first and second phase error information to a phase error detection unit, controlling timing of the input clock signal based on first control information at an output of the clock and data recovery unit, and controlling timing of the first and second clock signals based on second control information at an output of the phase error detection unit.

In Example 22, the subject matter of Example 26 may optionally include, wherein controlling timing of the input clock signal based on the first control information includes providing the first control information to an input clock generator that generates the input clock signal.

In Example 23, the subject matter of Example 26 or 27 may optionally include, wherein controlling timing of the first and second clock signals includes providing the second control information to first and second clock generators that generate the first and second clock signals, respectively.

Example 24 includes subject matter (such as a device, an electronic apparatus (e.g., circuit, electronic system, or both), or machine) including means for performing any of the methods of Examples 21-23.

The subject matter of Example 1 through Example 24 may be combined in any combination.

The above description and the drawings illustrate some embodiments to enable those skilled in the art to practice the embodiments of the invention. Other embodiments may incorporate structural, logical, electrical, process, and other changes. Examples merely typify possible variations. Portions and features of some embodiments may be included in, or substituted for, those of other embodiments. Many other embodiments will be apparent to those of skill in the art upon reading and understanding the above description. Therefore, the scope of various embodiments is determined by the appended claims, along with the full range of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
   clock generation circuitry to generate a first clock signal and a second clock signal based on an input clock signal, the first and second clock signals having different phases;
   sampler circuitry to sample an input signal based on timing of the first and second clock signals and provide data information and error information associated with sampling of the input signal;
   a clock and data recovery unit to generate first control information based on the data information and the error information; and
   a phase error detection unit to generate second control information based on the data information and the error information, the clock generation circuitry to control timing of the input clock signal based on the first control information and to control timing of the first and second clock signals based on the second control information, wherein the sampler circuitry include first sampler circuits having inputs to receive the input signal, and second sampler circuits having inputs to receive the input signal, and the phase error detection unit includes a first phase detector having inputs coupled to outputs of the first sampler circuits, and a second phase detector having inputs coupled to outputs of the second sampler circuits.

2. The apparatus of claim 1, wherein the phase error detection unit includes:
   a first summer coupled to the first phase detector; and
   a second summer coupled to the second phase detector.

3. The apparatus of claim 1, wherein the clock generation circuitry includes a phase rotator to receive the first control information in order to adjust timing of the input clock signal.

4. The apparatus of claim 3, wherein the clock generation circuitry includes a first delay line to generate the first clock signal, and second delay line to generate the second clock signal, and the first and second delay lines are to adjust timing of the first and second clock signals, respectively, based on the second control information.

5. The apparatus of claim 1, wherein the clock and data recovery unit includes a baud-rate clock and data recovery unit.

6. An apparatus comprising:
   an input to receive an input signal;
   an input clock generator to generate an input clock signal;
   first and second clock generators to generate a first clock signal and a second clock signal, respectively, based on the input clock signal, the first and second clock signals having different phases;
   sampler circuitry to sample the input signal based on timing of the first and second clock signals and provide data information and error information associated with the sampling of the input signal;
   a clock and data recovery unit to generate first control information based on the data information and the error information and provide the first control information to the input clock generator; and
   a phase error detection unit to generate second control information based on the data information and the error information and to provide the second control information to the first and second clock generators, wherein the sampler circuitry includes:
   a first circuit path to sample the input signal based on timing of the first clock signal and provide a first portion of the data information and a first portion of error information; and
   a second circuit path to sample the input signal based on timing of the second clock and provide a second portion of the data information and a second portion of the error information.

7. The apparatus of claim 6, wherein the first and second clock generators are to generate the first clock signal having a first phase difference with the input clock signal and to generate the second clock signal having a second phase difference with the input clock signal, and at least one of the first and second phase differences is a multiple of 90 degrees.

8. The apparatus of claim 6, wherein the first and second clock generators include:
   a first delay line to delay the input clock signal in order to generate the first clock signal; and
   a second delay line to delay the input clock signal in order to generate the second clock signal.

9. The apparatus of claim 8, wherein the first delay line is to delay the input clock signal by an amount of delay based on a value of a first portion the second control information, and the second delay line is to delay the input clock signal by an amount of delay based on a value of a second portion of the second control information.

10. The apparatus of claim 6, wherein each of the first and second circuit path include a first sampler circuit to sample the input signal and a second sampler circuit to sample the input signal.

* * * * *